(12) United States Patent
Taş et al.

(10) Patent No.: US 11,904,517 B2
(45) Date of Patent: Feb. 20, 2024

(54) MOLD STRUCTURE FOR INJECTION END WELDING IN SEALING PROFILES

(71) Applicant: STANDARD PROFIL EGE OTOMOTIV SANAYI VE TICARET ANONIM SIRKETI, Istanbul (TR)

(72) Inventors: Suleyman Erhan Taş, Bursa (TR); Mehmet Apaydin, Manisa (TR); Celal Bayrak, Manisa (TR)

( * ) Notice: Subject to any disclaimer, the term of this patent is extended or adjusted under 35 U.S.C. 154(b) by 373 days.

(21) Appl. No.: 16/973,813

(22) PCT Filed: Jul. 23, 2019

(86) PCT No.: PCT/TR2019/050604
§ 371 (c)(1),
(2) Date: Dec. 10, 2020

(87) PCT Pub. No.: WO2021/015682
PCT Pub. Date: Jan. 28, 2021

(65) Prior Publication Data
US 2021/0162640 A1 Jun. 3, 2021

(51) Int. Cl.
*B29C 45/26* (2006.01)
*B29C 45/14* (2006.01)
(Continued)

(52) U.S. Cl.
CPC ........ *B29C 45/2673* (2013.01); *B29C 33/304* (2013.01); *B29C 45/14467* (2013.01);
(Continued)

(58) Field of Classification Search
CPC ....... B29L 2031/001–006; B29C 39/14; B29C 39/148; B29C 39/18; B29C 45/176;
(Continued)

(56) References Cited

U.S. PATENT DOCUMENTS 4,722,818 A * 2/1988 Zoller ..................... B29C 48/12
156/244.11
5,266,246 A * 11/1993 Johnson .............. B29C 45/2701
425/149

(Continued)

FOREIGN PATENT DOCUMENTS

CN 113500745 A * 10/2021
DE 102008037131 B4 * 3/2013 ........... B29C 43/021
(Continued)

OTHER PUBLICATIONS

International Search Report and Written Opinion of the International Searching Authority for corresponding PCT/TR2019/050604, dated Nov. 19, 2020.

*Primary Examiner* — Atul P. Khare
(74) *Attorney, Agent, or Firm* — Egbert, McDaniel & Swartz, PLLC

(57) ABSTRACT

Disclosed is an end welding mold for providing end welding in all moving or fixed glass profiles of vehicles via injection method, having at least one mold core providing geometric shaping of the paste which is transferred by a hot runner system or a cold runner system, which is changeable depending on different end welding references. It could also be applied to dynamic sealings ends (eg. door seals) on cars if they have an end moulding.

10 Claims, 2 Drawing Sheets

(51) Int. Cl.
*B29C 45/27* (2006.01)
*B29C 33/30* (2006.01)
*B29C 45/17* (2006.01)
*B29L 31/30* (2006.01)
*B29K 709/08* (2006.01)
*B29K 21/00* (2006.01)
*B29K 23/00* (2006.01)
*B29L 31/26* (2006.01)
*B29L 31/00* (2006.01)

(52) U.S. Cl.
CPC ............ *B29C 45/176* (2013.01); *B29C 45/27* (2013.01); *B29C 2045/14524* (2013.01); *B29K 2021/003* (2013.01); *B29K 2021/006* (2013.01); *B29K 2023/16* (2013.01); *B29K 2709/08* (2013.01); *B29L 2031/001* (2013.01); *B29L 2031/26* (2013.01); *B29L 2031/30* (2013.01)

(58) Field of Classification Search
CPC . B29C 45/36; B29C 45/2606; B29C 45/2673; B29C 45/2675; B29C 45/27–30; B29C 2045/1791; B29C 2045/302–308; B29C 2045/363

See application file for complete search history.

(56) References Cited

U.S. PATENT DOCUMENTS

| | | | |
|---|---|---|---|
| 5,451,156 A | | 9/1995 | Roncelli et al. |
| 6,328,552 B1 | | 12/2001 | Martz |
| 7,122,137 B2 | * | 10/2006 | Summerer ............ B29C 45/561 |
| | | | 425/808 |
| 10,207,440 B2 | * | 2/2019 | Raleigh ............... B29C 45/2681 |
| 2011/0115117 A1 | | 5/2011 | Desmith et al. |
| 2017/0080791 A1 | | 3/2017 | Hemauer |

FOREIGN PATENT DOCUMENTS

| | | | | |
|---|---|---|---|---|
| DE | 102012100419 A1 | * | 7/2013 | ......... B29C 45/2673 |
| DE | 102006048413 B4 | * | 9/2016 | ....... B29C 45/14418 |
| EP | 1690665 A1 | * | 8/2006 | ......... B29C 45/1635 |
| GB | 1076033 A | * | 7/1967 | ............. B29C 47/94 |
| JP | 08216696 A | * | 8/1996 | ............. B29C 65/00 |
| KR | 100849533 B1 | * | 7/2008 | ............. B29C 45/10 |

* cited by examiner

MOLD STRUCTURE FOR INJECTION END WELDING IN SEALING PROFILES

FIELD OF THE INVENTION

The present invention relates to a mold structure for end welding in sealing profiles of car windows.

The present invention more particularly relates to an end welding mold for provision of TPE/TPV/EPDM end welding to moving and fixed windows for all vehicle segments in the automotive industry, including dynamic seals (e.g. door seals) with end mouldings.

PRIOR ART

Profile structures are used in the moving and fixed windows of all vehicle segments in the automotive industry. These profile structure allow for quiet operation of windows over their respective channels and doors with minimum friction and/or provides dust or water proofing or sound and thermal insulation. TPE/TPV/EPDM end welding are placed at the end portion of the profiles.

In existing applications, at first, profiles are manufactured at the extrusion line and then the profiles go through cutting and discharging processes at the finishing line according to technical drawings for assembly into the vehicle. Then, injection molding is applied to both ends of the profile according to product data and the product takes its final shape.

Patent application no. US2017080791A1 is related to an application with a similar method of production. Said patent application basically relates to a profile and a production method thereof. According to the patent application, end cover of the profile is made of thermoplastic material and adapted through profile via welding. An injection molding device is used to produce end covers corresponding to the end cover slots on the profile.

This application and similar applications require changes in the molds and also the preferred hot or cold runner systems depending on the material used (TPE/TPV/EPDM). Moreover, the configuration also needs to be changed for each different type of production. Additionally, if a repair or maintenance work is required, separate spare parts need to be used for each different product. Changes in the types of products lead to extended installation times and labor costs with no extra added value.

Consequently, since various challenges are present as stated above and the existing applications are lacking in providing a satisfactory solution to these challenges, further improvements need to be introduced to the technical field.

BRIEF DESCRIPTION OF THE INVENTION

The present invention relates to a glass profile end welding mold wherein the glass profile end welding mold meets the abovementioned requirements, eliminates all disadvantages and brings additional benefits.

The main object of the invention is to reduce molding costs and produce an end welding mold with reduced overall production costs thanks to efficient use of resources.

Another object of the invention is to provide a mold wherein the mold eliminates the need for labor with no added value during the reference changeover.

Yet another object of the invention is to provide a mold with reduced installation and adjustment time.

Another object of the invention is to provide a mold wherein the mold reduces the risk of occupational accidents and offers ergonomic benefits.

Another object of the invention is to provide a mold wherein the mold eliminates the need to keep separate spare parts for different molds and their hot and cold runner systems, thereby reducing spare parts inventory costs.

Yet another object of the invention is to provide a mold wherein, the mold offers less energy consumption, less heat loss and less material use for the same reference values.

Another object of the invention is to provide a mold with extended economic life.

The present invention is intended to provide a mold wherein the said mold allows for quicker mold design and production.

The present invention is intended to provide a mold wherein the mold allows for quicker mold design and production.

The present invention relates to an end welding mold for providing end welding in all moving or fixed glass profiles of vehicles or dynamic seals like door seals via injection method by using material paste transferred by a hot runner system or a cold runner system. The end welding mold comprising; at least one mold core which is changeable depending on different end welding references; and through which the profile is passed for geometric shaping of the paste which is transferred by the hot runner system or the cold runner system.

In order to achieve the abovementioned objects, the present invention also comprises a bottom plate to establish contact between the mold core and the press.

In order to achieve the abovementioned objects, the present invention also comprises a top plate to establish contact between the upper portion of the mold core and the press and the hot or cold runner system.

In order to achieve the abovementioned objects, the present invention further comprises pins to establish contact between the mold core and the top and bottom plates.

In order to achieve the abovementioned objects, the mold core comprises an interconnected top block and bottom block.

In order to achieve the abovementioned objects, the mold core further comprises a profile channel whereby the profile defined between the top block and bottom block passes through the profile channel.

The structural properties, characteristics and all benefits of the invention will be more clearly understood by reading the detailed description of the invention in conjunction with the below drawings. Therefore, the invention will be best appreciated by reading the detailed description in conjunction with the accompanying drawings.

BRIEF DESCRIPTION OF DRAWINGS

The drawings are not necessarily scaled and details not essential for understanding the invention may be omitted. Furthermore, components that are considerably identical or with considerably identical functions are designated using the same numerals as shown below.

DETAILED DESCRIPTION OF THE INVENTION

The detailed description of the sealing profile (50) end welding mold (10) of the present invention is intended for purposes of illustration of the preferred embodiments of the invention only and is not intended to limit the scope of the disclosure.

Figure 1:
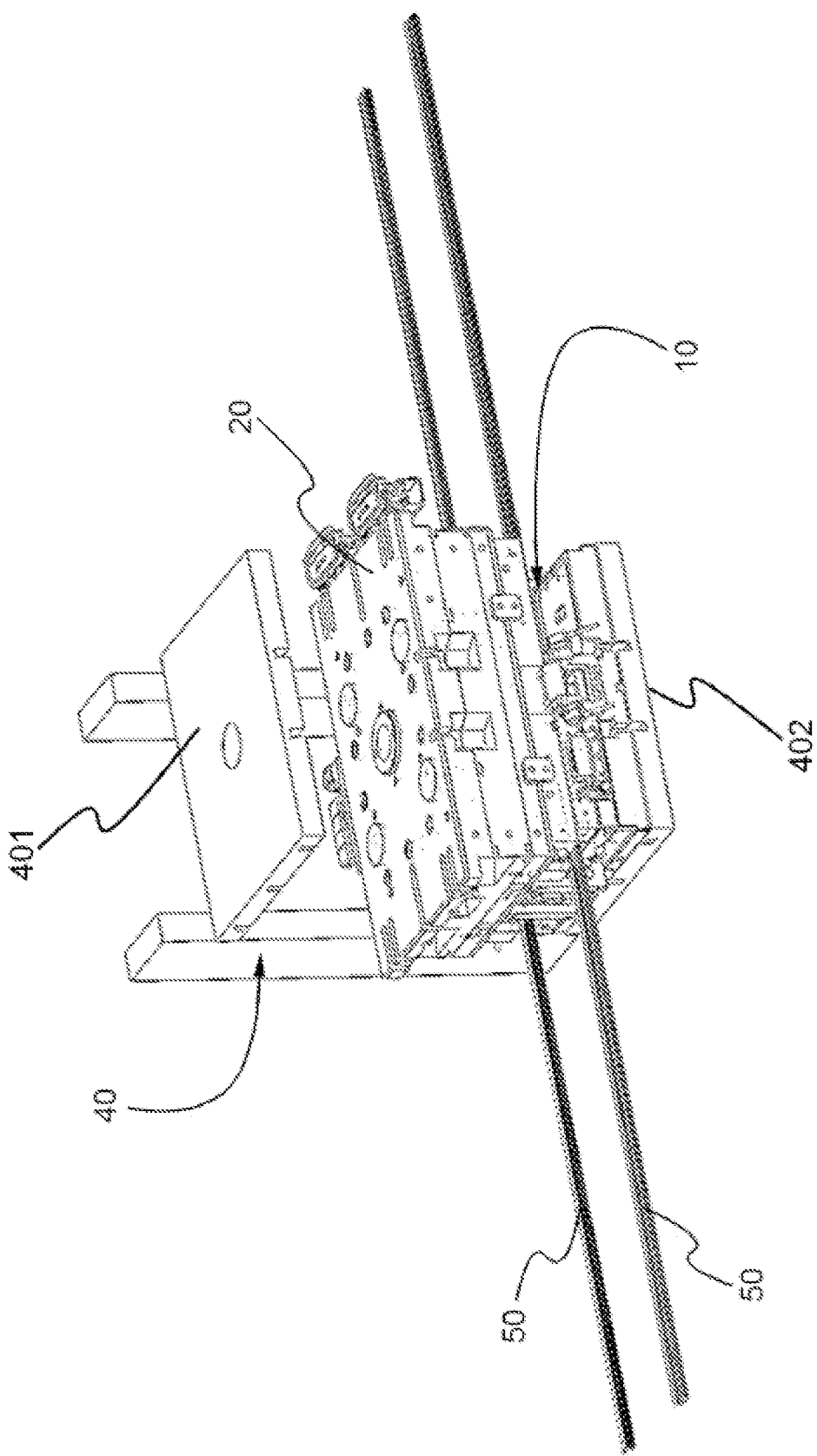
FIG. 1. Is a general view of the end welding mold of the present invention together with the injection press.

The end welding mold (10) of the present invention is intended to be used for shaping the sealing profile (50) end welding installed in all vehicle moving and fixed windows by way of the injection method. With reference to FIG. 1, the end welding mold (10) which is in contact with a press (40) is used for shaping end welding. During the end welding production process, the hot runner system (20) shown in FIG. 2 or the cold runner system (30) shown in FIG. 3 is used to deliver a certain amount of material paste to the end welding mold (10). In cases where TPE and TPV pastes are used, the hot runner system (20) comes into contact with the end welding mold (10), while the same is true for the cold runner system (30) in cases of EPDM application.

Figure 2:
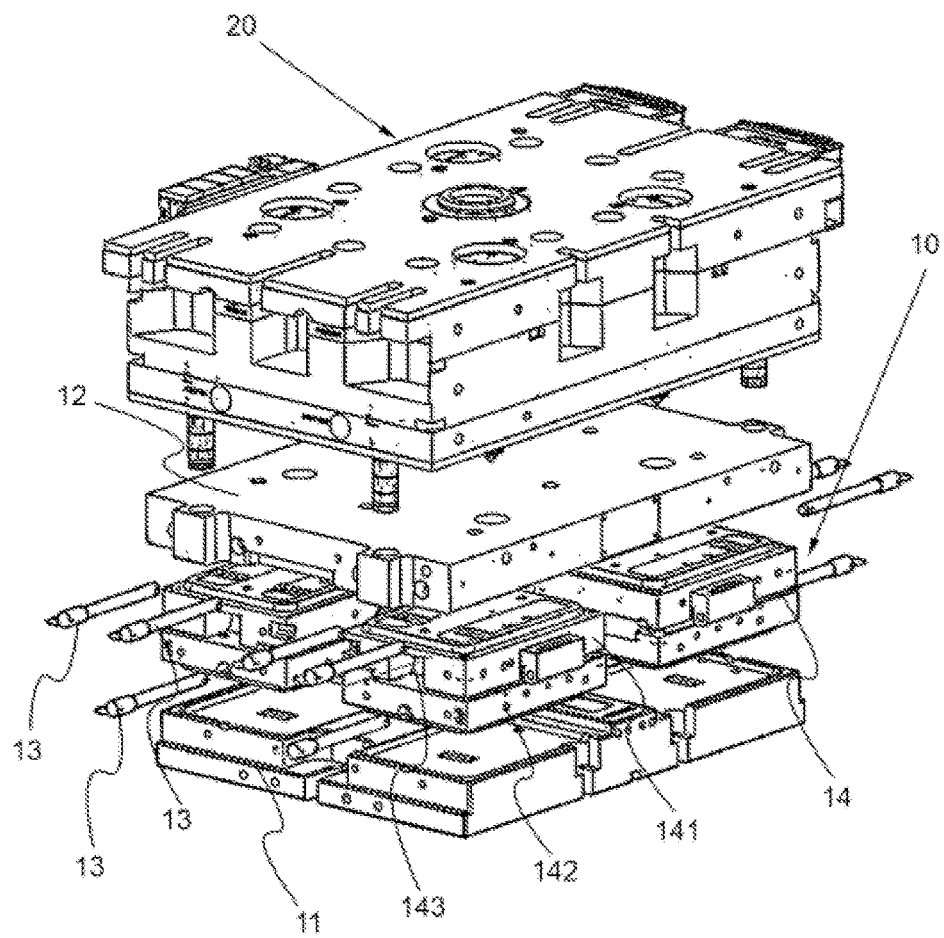
FIG. 2. Is a detailed view of end welding mold of the present invention.
Figure 3:
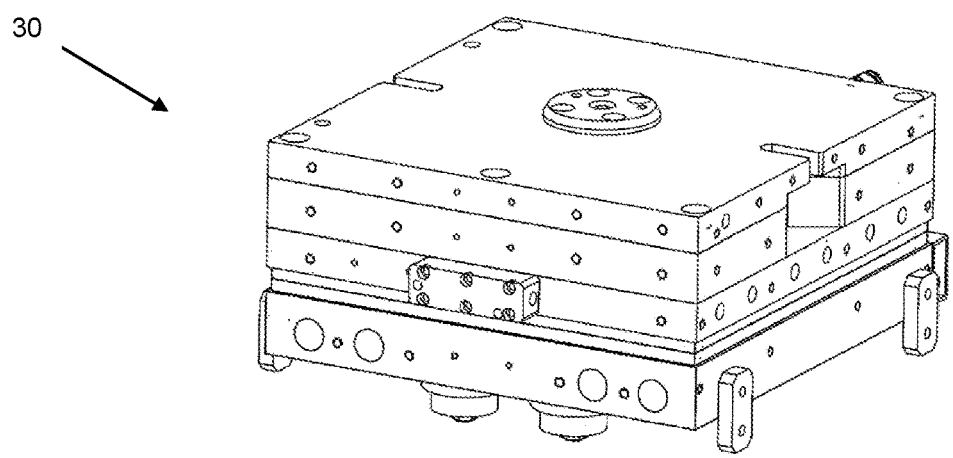
FIG. 3. Is a general view of cold runner system.

The end welding mold (10) shown in detailed view in FIG. 2 comprises a mold bottom plate (11), a top mold plate (12) placed sufficiently parallel to the mold bottom plate (11), preferably two mold cores (14) in contact between the mold bottom plate (11) and the mold top plate (12), and pins (13) to adapt the mold cores (14) to the mold bottom plate (11) and mold top plate (12) and to allow for easy assembly/ disassembly and also centering and referencing operations. Preferably ball pins (13) are used. The pins (13) also serve as a poka-yoke mechanism in ensuring the mold cores (14) are placed in the correct slots. The mold bottom plate (11) is where the mold cores (14) establish contact, and it also connects the mold (10) to the press (40). The mold top plate (12) is where the mold cores (14) establish contact with the hot runner system (20) or the cold runner system (30), and it also connects the mold (10) to the press (40).

In FIG. 1, the top plate of press (401) is defined as the upper plate of the press (40) and the bottom plate of press (402) is defined as the lower plate of press (40).

Mold cores (14) enable geometric shaping of the injection area which produces the end welding in the sealing profile (50). Mold cores (14) comprise a top block (141) and a bottom block (142) placed on top of one another. There is a profile channel (143) defined between the top block (141) and the bottom block (142). The profile (50) passes through the profile channel (143) for end welding injection operation. The number of mold cores (14) can be changed based on the needed injection welding.

As a component of the end welding mold (10), mold cores (14) are produced in different shapes and sizes according to the geometry of the injection welding. On the other hand, the mold bottom plate (11) and the mold top plate (12) are always produced in a uniform manner with standard sizes suitable for standard assembly points of the mold cores (14). Accordingly, the hot runner system (20) and the cold runner system (30) can also be produced with a standardized size and design.

The mold (10) of the present invention eliminates the need to produce separate mold bottom plates (11), mold top plates (12), mold operation mechanism system, hot runner systems (20) or cold runner systems (30) for each end welding reference. The end welding mold (10) can be adjusted for all reference values thanks to production of a mold core (14) compatible with the standard type of mold bottom plate (11) and mold top plate (12) and a simple installation process. This makes it possible to produce molds (10) at a cost rate of 20% for each reference value compared to previous applications, thereby providing savings in manufacturing costs. Another benefit of the present invention is that it eliminates the need for labor with no added value during the reference changeover in end welding molds (10). Instead of removing the mold and inserting a new mold as traditionally implemented in end welding molds, everything remains intact except for mold cores (14), which saves time in installation and adjustments. Accordingly, this also helps with reduction in mold design and production times. The end welding mold (10) of the present invention reduces the risk of occupational accidents and offers ergonomic benefits. Furthermore, the present invention also eliminates the need to keep separate spare parts for different molds and their hot and cold runner systems (20, 30), thereby reducing spare parts inventory costs. The present invention more particularly makes it possible to reduce import of hot runner systems (20) and cold runner systems (30). Such optimization of the manufacturing parameters further allows for production with less energy consumption, less heat loss and minimum material use for the sealing profile (50).

The invention claimed is:

1. An end welding mold for providing an end welding in a glass sealing profile via injection with a material paste, the end welding mold comprising:
   a changeable mold core corresponding to the end welding;
   a hot or cold runner system adapted to deliver the material paste into the mold core:
   a press; and
   a top plate establishing contact between an upper portion of said mold core and said press, said mold core establishing contact with the hot or cold runner system at the top plate and being adapted to shape the material paste delivered by the hot or cold runner system into the end welding while the glass sealing profile passes therethrough, wherein the top plate and the hot or cold runner system have a standardized size and design compatible with replacement mold cores corresponding to different end welding designs.

2. The end welding mold of claim 1, further comprising:
   a bottom plate establishing contact between a bottom portion of said mold core and said press.

3. The end welding mold of claim 2, further comprising:
   a plurality of pins establishing contact between said mold core and said top and bottom plates.

4. The end welding mold of claim 3, wherein some of the plurality of pins are arranged horizontally between said mold core and said top plate and some of the plurality of pins are arranged horizontally between said mold core and said bottom plate.

5. The end welding mold of claim 1, further comprising:
   a plurality of pins establishing contact between said mold core and said top plate.

6. The end welding mold of claim 5, wherein the plurality of pins are arranged horizontally between said mold core and said top plate.

7. The end welding mold of claim 1, wherein said mold core comprises an interconnected top and bottom block.

8. The end welding mold of claim 7, wherein said mold core comprises a profile channel defined between the top and bottom block, wherein the sealing profile is adapted to pass through the profile channel for said shaping of the material paste.

9. The end welding mold of claim 1, further comprising the replacement mold cores corresponding to the different end welding designs.

10. The end welding mold of claim 1, wherein the changeable mold core is one of multiple changeable mold cores, the top plate establishing contact between an upper portion of said mold cores and said press, and said mold cores establishing contact with the hot or cold runner system at the top plate and being adapted to shape the material paste delivered by the hot or cold runner system into the end welding.

\* \* \* \* \*